Figure 2:
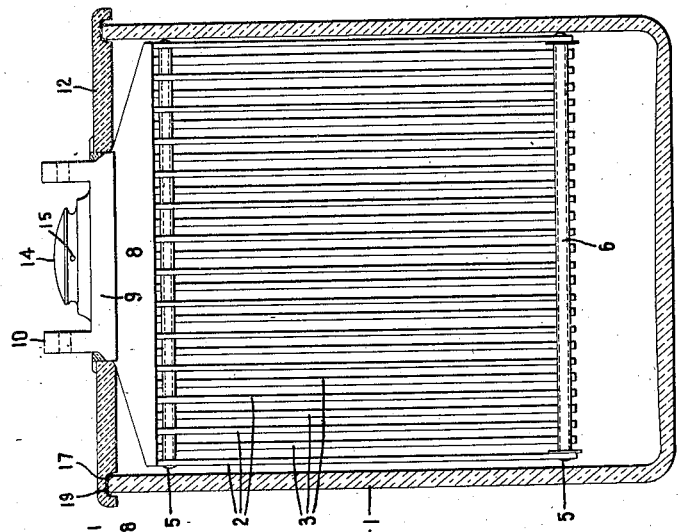

March 7, 1933. A. H. SNYDER 1,900,308
STORAGE BATTERY CELL
Filed Oct. 18, 1928

Inventor
Almond H. Snyder
By
His Attorney

Patented Mar. 7, 1933

1,900,308

UNITED STATES PATENT OFFICE

ALMOND H. SNYDER, OF LANCASTER, NEW YORK, ASSIGNOR, BY MESNE ASSIGNMENTS, TO GOULD STORAGE BATTERY CORPORATION, OF DEPEW, NEW YORK, A CORPORATION OF DELAWARE

STORAGE BATTERY CELL

Application filed October 18, 1928. Serial No. 313,351.

The invention relates to storage batteries, particularly those of the sealed glass jar type.

The principal object of the invention, generally stated, is to provide a novel method of and means for supporting the unit or plate assembly from the container or jar itself.

It is well known that it is a common practice to support the unit or group of plates upon rigs in the bottom of the jar or other container, or to suspend them from the cover. If the first plan is adopted it is necessary to provide special jars, or equivalent receptacles, of the molded type with ribs in the bottom, or to provide extra pieces resting on the bottom of the jar. These ribs, bridges or other pieces take up valuable sediment space and have other disadvantages well recognized in the art. If the plan is adopted of suspending the plates from the cover, especially where the group is large and heavy, there is great danger of the cover breaking especially if it be made from a hard material such as glass. If the cover be made of hard rubber or other similar composition it has a tendency to sag or warp out of shape on account of the weight of the plates.

It is with all of the above facts in view that I have devised the present invention which has for an important object the provision of a construction whereby the weight of the plates is sustained by the upper edges of the opposite sides of the jar or other container, the container moreover having a cover structure which is effectually sealed throughout notwithstanding the presence of the suspension means.

Another object of the invention is to provide a battery cell having these characteristics and provided with a novel cover for the accommodation of the suspension elements, this cover being specially formed to permit the employment of sealing means cooperating not only with the container but also with the suspension means so that leakage and spraying of the electrolyte during charging of the battery will be entirely avoided in exactly the same manner as if the special suspension means were not provided.

Another object of the invention is to provide a group of storage battery plates with peculiarly constructed terminal lugs common to all of the corresponding plates and capable of being brazed or "burned" thereonto to effect a substantial integrality.

An additional object of the invention is to provide an arrangement of this character which will be simple and inexpensive to manufacture, easy to install or assemble, positive in action, efficient and durable in service, and a general improvement in the art.

Figure 1:
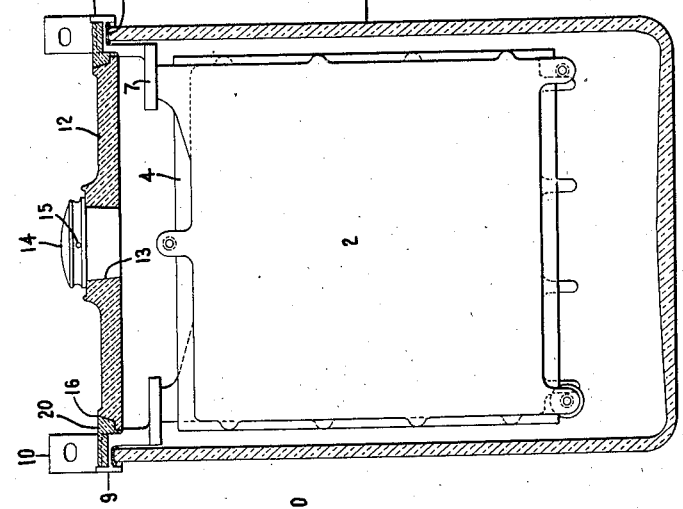
Figure 3:
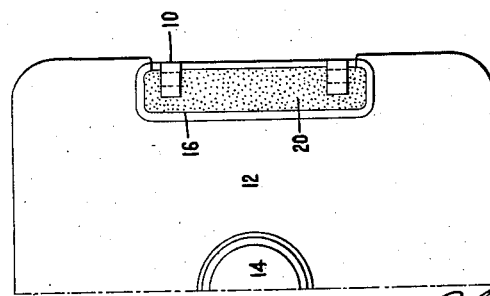

To the attainment of the foregoing and other objects and advantages, the invention preferably consists in the details of construction and the arrangement and combination of parts to be hereinafter more fully described and claimed, and illustrated in the accompanying drawing in which:

Figure 1 is a vertical sectional view through a storage battery constructed in accordance with the invention, Figure 2 is a vertical cross section at right angles to Figure 1 showing the plate assembly in edge elevation, only the cover and receptacle being really in section, and Figure 3 is a top plan view of one half of the cover.

Referring more particularly to the drawing, the numeral 1 designates the jar or container which may of course be of any desired material but which in actual practice is preferably of glass. This jar is of general rectangular shape and is open at the top to permit the insertion of the plates which are arranged necessarily in two groups, one positive and the other negative, those in one group being designated by the numeral 2 and those in the other by the numeral 3, any desired character or number or type of separators being provided as is customary. It is immaterial insofar as the present invention is concerned what the separators may be though they are indicated at 4. Furthermore any preferred means may be provided for tying together the plates of the respective groups, this means being conveniently tie bolts 5 which may or may not carry spacing sleeves 6 as preferred.

The essential feature of the invention resides in the terminal construction and it will be observed that the plates in each group, positive or negative, are connected by a cross bar 7 which may be brazed, cast or "burned" thereonto. The cross bar is represented as having an upward extension 8 terminating in a horizontal flange or more or less hook-like retaining element 9 adapted to seat upon the upper edge of the jar or container. It is not necessary that this flange or retaining element 9 be of the same length as the width of the entire group of plates though such could be the case if found advisable for any reason. In the drawing the retaining element is disclosed as of considerably less length and it is naturally provided with terminal lugs 10 which may be of any specific construction depending upon the service to which the battery is to be put or the type of conductor to be connected therewith. While it is not essential the horizontal flanges or retaining elements 9 are shown as having their outer ends formed with projections 11 which extend above and below as clearly indicated, the lower extending portions defining, in effect, hooks adapted to engage against the outer surfaces of the walls of the container as will be readily understood from an inspection of Figure 1.

The cell also comprises a cover 12 which may be of glass or any suitable composition such as hard rubber or the like, this being really immaterial. At some convenient point the cover is provided with a filling opening 13 through which electrolyte, and subsequently water, may be poured, this opening being normally closed by a plug or cap 14 vented at 15, as is the common practice, to permit the escape of gas. At its opposite edges the cover is cut away at 16, or otherwise formed to provide spaces for the accommodation of the flanges or retaining elements 9. In addition to this it is preferable that the cover be channeled at its underside as indicated at 17 in Figure 2 to fit more or less snugly upon the upper edge of the container.

It is intended that the unit be shipped assembled with the plates attached to the cross bars with the terminals and necessary separators in place. When ready to install, a small strip of suitable sealing compound 18 is placed on top of the edge of the jar or container where the flanges 9 are to rest. The plate assembly is then lowered into the jar and the weight of the flanges resting on the strips of compound at the opposite sides will form a seal between the jar and the flanges. A small amount of sealing compound 19 is placed, by pouring or otherwise, in the groove 17 in the underside of the cover. The cover is then placed on top of the jar or other container and pressed down, making a seal. Sealing compound, indicated at 20, is then poured into the openings 16 in the cover provided for the accommodation of the flanges 9 and this will act to seal the cell completely, preventing the escape of spray during charge and lessening the evaporation of the water in the electrolyte.

From the foregoing description and a study of the drawing it will be apparent that I have thus provided a storage battery cell which will be leak-proof insofar as the cover connection is concerned and which has the great advantage that the weight of the plate assembly is borne entirely by the jar or receptacle instead of resting upon ribs in the bottom or being suspended from the cover, both of which plans are old and well known and known to be disadvantageous. Inasmuch as the suspension or retaining elements are hook-like in form it is obvious that there can be no shifting of the groups of plates laterally within the cell. From the foregoing it is thought that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a storage battery of the sealed type, a container, groups of plates therein, a metallic member connecting all the plates of each group and terminating in a projecting portion engaged upon the upper edge of the container, upstanding terminal lugs on said members, a cover sealed upon the container and having peripheral notches for the accommodation of the projecting portions of said metallic members, and sealing means within said openings, said projecting portions having upstanding flanges closing said notches.

2. In a storage battery of the sealed type, a container, groups of plates therein, a metallic member connecting all the plates of each group and terminating in a projecting portion engaged upon the upper edge of the container, and a cover sealed upon the container and having peripheral notches for the accommodation of the projecting portions of said metallic members, and sealing means within said openings, said projecting portions having depending projections on the edges thereof defining substantial hooks cooperating with the edge of the container and each carrying upstanding spaced terminal lugs, said projecting portions having at their ends upstanding flanges flush with the top of the cover and constituting closures for the outer ends of said notches.

3. In a storage battery, a container, groups of interleaved positive and negative plates therein, a cross bar connecting all the plates of each group, said cross bars being located at opposite sides of the container, an outwardly projecting horizontal extension on each cross bar engaging upon the top edge of the container and terminating in a downwardly extending flange engaging against the exterior surface of the container, terminal members projecting upwardly from said extensions, a cover having peripheral notches accommodating said extensions, each extension having an upstanding flange at its end substantially flush with the edge and top of the cover and closing the notch.

4. In a storage battery, a container, groups of interleaved positive and negative plates therein, a cross bar connecting all the plates of each group, the cross bars being located at opposite sides of the container, an outwardly projecting horizontal extension at the top of each cross bar engaging upon the top edge of the container, said extensions each having a length greater than the combined thickness of several plates and provided with upstanding terminals, a cover seating upon the top of the container and provided at opposite edges with cut out portions accommodating said extensions, said extensions having their extremities provided with upstanding flanges extending throughout the length of said cut out portions and substantially flush with the top of the cover, and a mass of sealing material within each cut out portion.

5. In a storage battery, a container, groups of interleaved positive and negative plates therein, a cross bar connecting the plates of each group, said cross bars being located at opposite sides of the container, each cross bar having its central portion projected upwardly to substantially the top of the container and formed at its upper edge with an outwardly projecting horizontal extension resting upon the top edge of the container, said extension having a length greater than the combined thickness of several of the plates and terminating in a downwardly extending flange engaging against the outside of the container, and an upstanding flange substantially alining with the outer edge of the container, a cover fitting upon the container and having cut out portions accommodating said extensions, said upstanding flanges substantially closing the outer ends of said cut out portions, and a mass of sealing material within the cut out portions.

In testimony whereof I affix my signature.

ALMOND H. SNYDER.